US006939231B2

(12) United States Patent
Mäntyjärvi et al.

(10) Patent No.: US 6,939,231 B2
(45) Date of Patent: Sep. 6, 2005

(54) METHOD FOR CONTROLLING A TERMINAL DISPLAY AND A TERMINAL

(75) Inventors: Jani Mäntyjärvi, Espoo (FI); Jari Paloniemi, Kiiminki (FI); Sami Ronkainen, Oulu (FI); Tatu Kauppinen, Helsinki (FI); Miika Silfverberg, Helsinki (FI)

(73) Assignee: Nokia Corporation, Espoo (FI)

(*) Notice: Subject to any disclaimer, the term of this patent is extended or adjusted under 35 U.S.C. 154(b) by 48 days.

(21) Appl. No.: 10/029,904

(22) Filed: Dec. 21, 2001

(65) Prior Publication Data

US 2002/0082079 A1 Jun. 27, 2002

(30) Foreign Application Priority Data

Dec. 22, 2000 (FI) ............................................ 20002841

(51) Int. Cl.[7] ............................. A63F 9/02; G06F 17/00
(52) U.S. Cl. .......................... 463/30; 715/864; 715/865
(58) Field of Search ........................ 463/1–5, 7, 30–33, 463/35–42, 48–49, 51–54, 56, 47; 345/418–419, 619, 162, 156–158, 168, 501, 173–184, 204, 207; 715/700–702, 764, 864, 865; 434/11, 128, 112–116; 379/428.03, 900, 907, 916

(56) References Cited

U.S. PATENT DOCUMENTS

| | | | | |
|---|---|---|---|---|
| 4,787,051 A | | 11/1988 | Olson | 364/518 |
| 4,839,838 A | * | 6/1989 | LaBiche et al. | 708/141 |
| 5,641,288 A | * | 6/1997 | Zaenglein, Jr. | 434/21 |
| 5,704,836 A | * | 1/1998 | Norton et al. | 463/36 |
| 5,913,727 A | * | 6/1999 | Ahdoot | 463/39 |
| 6,162,123 A | * | 12/2000 | Woolston | 463/37 |
| 6,200,219 B1 | * | 3/2001 | Rudell et al. | 463/37 |
| 6,201,554 B1 | * | 3/2001 | Lands | 345/169 |
| 6,227,974 B1 | * | 5/2001 | Eilat et al. | 463/40 |
| 6,375,572 B1 | * | 4/2002 | Masuyama et al. | 463/43 |
| 6,409,596 B1 | * | 6/2002 | Hayashida et al. | 463/31 |
| 6,461,238 B1 | * | 10/2002 | Rehkemper et al. | 463/6 |
| 6,650,318 B1 | * | 11/2003 | Arnon | 345/168 |
| 2001/0044318 A1 | * | 11/2001 | Mantyjarvi et al. | 455/550 |
| 2002/0010021 A1 | * | 1/2002 | McCauley | 463/37 |
| 2002/0072418 A1 | * | 6/2002 | Masuyama et al. | 463/43 |

FOREIGN PATENT DOCUMENTS

| | | |
|---|---|---|
| WO | WO 98/115828 | 3/1998 |
| WO | WO 99/18495 | 4/1999 |
| WO | WO 99/22338 | 5/1999 |
| WO | WO 99/32960 | 7/1999 |

OTHER PUBLICATIONS

Japanese Patent document No. 2000056897 (English Abstract is attached), Feb. 25, 2000.
Japanese Patent document No. 2000066804 (English Abstract is attached), Mar. 3, 2000.

* cited by examiner

*Primary Examiner*—Scott E. Jones
(74) *Attorney, Agent, or Firm*—Perman & Green, LLP

(57) ABSTRACT

A terminal includes a display and a user interface. The terminal also includes means for providing the terminal display with at least one virtual display, a display portion or an object, and means for moving at least the virtual display, the display portion or the object on the display using the motion of the terminal or the motion and/or location of an object proportioned to the terminal.

33 Claims, 4 Drawing Sheets

700
218
500
502
704
700
500
502
710
712
700
500
502
710
712

Fig. 1
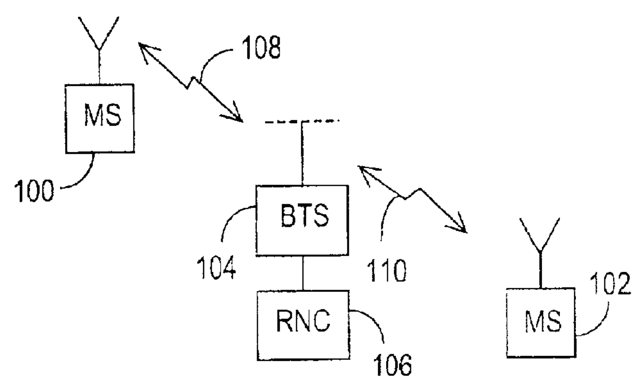
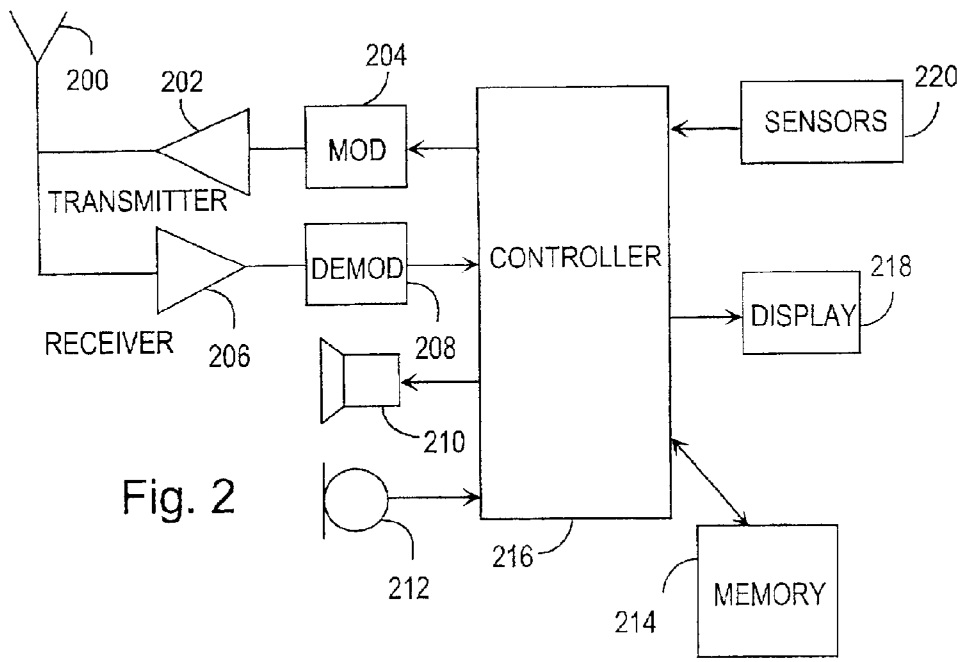
Fig. 2
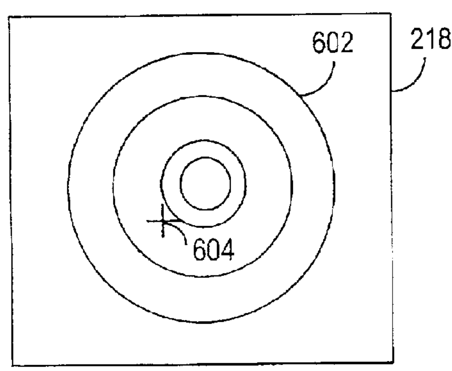
Fig. 6
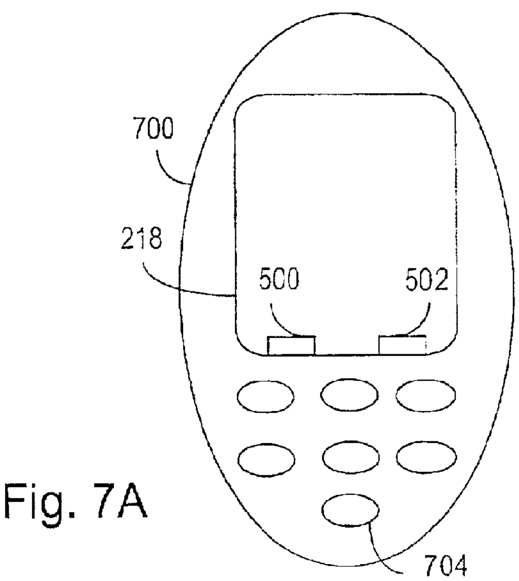
Fig. 7A

METHOD FOR CONTROLLING A TERMINAL DISPLAY AND A TERMINAL

FIELD

The invention relates to a method for controlling a display in a terminal, particularly in portable terminals, where the small size of the terminal restricts the size of the display and the user interface, and to a terminal.

BACKGROUND

At present the control of a display in telecommunication equipment, for example when playing different games, is generally based on using a mouse or different joysticks. When portable equipment such as handheld computers or phones are concerned, such solutions seem clumsy and impractical; a mouse may, for example, be of the same size as the entire apparatus. Likewise, if the motoric co-ordination or manual power of a terminal user have weakened due to injury or some other circumstance, such as age, the use of a mouse or joystick can be difficult. Therefore, a need is created to solve the display control of portable telecommunication equipment in particular in some other ways.

As component technology advances, new components have appeared on the market, such as acceleration sensors and proximity sensors. An acceleration sensor is generally an electromagnetic component generating to its output an electric signal corresponding to the acceleration. An acceleration sensor may presently be implemented in various ways, for example using a piezoelectric or piezoresistive crystal. The acceleration sensors may also be based on the motion of the mass. In such a case the motion of this mass is measured, for example capacitively, in order to determine the acceleration.

A change in the charge distribution of the piezoelectric crystal is comparable with the strength put upon the crystal. A piezoelectric crystal converts the mechanical labor into electricity and vice versa. In the piezoresistive crystal, in turn, the electric charge of the crystal is comparable with the power put upon the crystal.

The proximity sensors can be implemented using optical components. The optical proximity sensors are based on sending and receiving light of different wavelenghts. The focused light sent from a transmitter is reflected back from the target, the receiver receives the reflected signal and converts the signal to distance information, for example. The proximity sensors can also be implemented using other techniques, for example, pyro sensors sensitive for thermal radiation.

BRIEF DESCRIPTION

It is an object of the invention to provide an improved method for controlling a terminal display.

This is achieved with a method for controlling a terminal display. The method comprises the steps of providing the terminal display with at least one virtual display, a display portion or an object, and moving at least the virtual display, the display portion or the object on the display using the motion of the terminal or the motion and/or location of an object proportioned to the terminal.

The invention also relates to a terminal implementing the method, the terminal comprising a display and a user interface. The terminal comprises means for providing the terminal display with at least one virtual display, a display portion or an object, and the terminal comprises means for moving at least the virtual display, the display portion or the object on the display using the motion of the terminal or the motion and/or location of an object proportioned to the terminal.

The preferred embodiments of the invention are disclosed in the dependent claims.

The invention is based on the idea that the terminal display is provided with a virtual display, a display portion or an object, which are moved by means of the motion of the terminal or the motion and/or location of an object proportioned to the terminal. The object that is moved in relation to the terminal, thus controlling the terminal display, is preferably a hand, but may also be another object, such as an instrument intended for handicapped or elderly people.

The method and arrangement of the invention provide several advantages. The method of the invention allows to control the display of portable terminals without external user interfaces connected to the terminal, such as a mouse or a joystick. The virtual display created on the physical display allows to play games using portable equipment. Likewise, if the size of the actual display exceeds the one that can be fitted onto a physical display, then the physical display can be used to show only a part of the actual display and to browse the display rapidly and without accessories.

BRIEF DESCRIPTION OF THE DRAWINGS

In the following the invention will be described in greater detail by means of the preferred embodiments with reference to the accompanying drawings, in which FIG. 1 shows an example of a telecommunication system, FIG. 2 illustrates an example of a terminal, FIG. 6 shows an example of a virtual display in a shooting game, and FIGS. 7*a* to *c* show an example of how proximity sensors are positioned and a model of how a bow is drawn and released in an archery game.

DESCRIPTION OF EMBODIMENTS

Figure 7B:
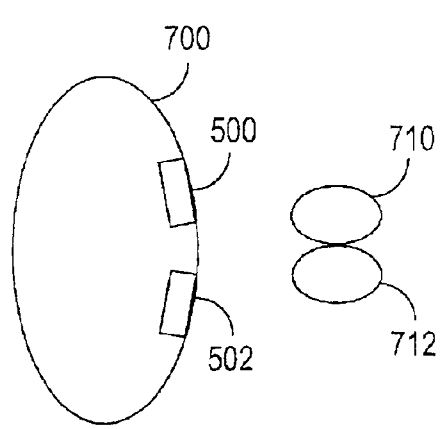

FIG. 1 illustrates in a simple manner a digital telecommunication system to which the solution of the invention can be applied. A part of a cellular radio system is concerned that comprises a base station 104, communicating over a radio connection 108 and 110 with subscriber terminals 100 and 102, which may be fixedly positioned, vehicle mounted or portable terminals. The base station includes transceivers. The base station transceivers communicate with an antenna unit, which is used to implement the radio connection to the subscriber terminal. The base station also communicates with a base station controller 106 that forwards the terminal connections to the rest of the network. The base station controller centrally controls several base stations communicating therewith. A control unit in the base station controller carries out call control, mobility management, statistical data assembly and signalling.

The cellular radio system may also communicate with a public telephone network.

FIG. 2 illustrates an example of a terminal, where acceleration sensors, proximity sensors, OTM sensors or corresponding components are utilized for controlling the display. The terminal may for instance be a portable phone or a microcomputer, however, without being restricted thereto.

The terminal described comprises an antenna 200, which is used to send and receive signals through a duplex filter. The terminal also comprises a transmitter 202 that amplifies and sends the modulated signal to the antenna, a modulator 204 that modulates the carrier wave with a data signal including the desired information in accordance with a selected modulation method, a receiver 206 that amplifies the signal arriving from the antenna and downconverts it to the selected intermediate frequency or directly to the baseband, a demodulator 208 that demodulates the received signal, so that a data signal can be distinguished from the carrier wave, and a controller part 216 comprising, for example, control and calculation means for controlling the operation of the different terminal parts and means for processing the user's speech or the data generated by the user, such as a DSP processor (Digital Signal Processing) comprising, for instance, channel equalizer operations that compensate for the interferences caused by the radio channel signal utilizing the data obtained from the channel using a known training sequence, A/D converters that convert the analogue signal into digital mode by sampling and quantizing the baseband signal, and D/A converters that convert the digital signal into analogue mode using a reversed method, filters that filter the frequencies outside the desired frequency band in the receiver or that restrict the bandwidth of the output in the transmitter in band-limited systems, and encoding and decoding means performing both channel and speech coding.

In channel coding, the systematic bit redundancy added to the signal, typically parity bits, is used in the decoder for detecting and correcting errors. In speech coding, in source coding in general, the unsystematic redundancy in the source symbols is typically removed in order to reduce the required bit rate. In addition, in spread spectrum systems, such as the WCDMA, the signal spectrum is spread in the transmitter using a pseudo-random spreading code to a broad band, and the signal spectrum is despread in the receiver, thus attempting to increase the channel capacity. Coding may be employed for enciphering the output or the information therein. Furthermore, the controller part typically comprises in the GSM system apparatuses burst generation means, which add the tail bits of the burst and the training sequence to the data arriving from the channel codec. The controller part also comprises means for arranging the signal to be sent as well as the signalling information to be in line with the air interface standard of the cellular radio system in use. The controller part 216 also comprises means for processing sensor signals and for controlling the display. The above terminal is a terminal in a digital cellular radio system, but the invention may correspondingly be applied to analogue systems.

The user interface of the terminal comprises a loudspeaker or a headphone 210, a microphone 212, a display 218 and possibly a keyboard communicating with the controller part. The keyboard may also be a touch control switch. The display may be a black or white one or a colour display, and the image on the display may either be motionless or moving. The terminal also comprises one or more acceleration or proximity sensors or corresponding components 220 for controlling the display. The sensors allow, for example, to detect the location or motion of the hand or another object in relation to the display. The terminal may also comprise a camera for taking images in order to identify motion. The terminal also comprises various memory elements, which are presented as a single functional block 214. The memory element includes, for example stored data, such as messages arriving to the user from the network part of the system. A part of the memory element can also be employed as a memory buffer. The memory element also includes a program controlling the operation of the terminal and comprising, for example, sub-programs that typically handle different tasks associated with the control of the display. The operations according to the invention for processing the sensor signals and for controlling the display can typically be implemented by software by including software comprising the required commands to be used by the control unit of the terminal.

Figure 3:
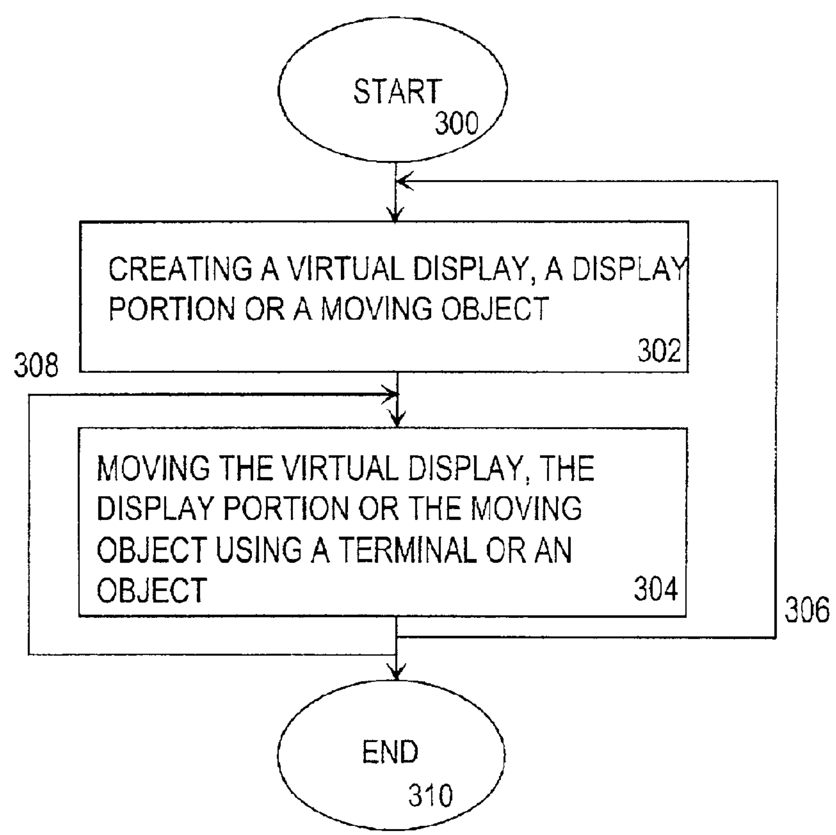
FIG. 3 is a flowchart showing the method steps for controlling a terminal display.

FIG. 3 is a flow chart showing the method steps for controlling the display of the terminal. The terminal display can be controlled when the terminal is, for example, in the user's hand, on the user's lap or on the table. The method starts from block 300. In block 302 at least one virtual display, a display portion or an object, which can be moved, is created for the physical display of the terminal. In block 304, at least the single virtual display, the display portion or the object on the display is moved using the motion of the terminal or the motion and/or location of an object proportioned to the terminal. The motion of the terminal or the motion or location of an object, such as a hand or an instrument for handicapped or elderly people in relation to the terminal, is observed using acceleration sensors, proximity sensors or other kinds of generally optical sensors, such as OTM sensors or using a camera to take at least two consecutive images, and identifying the motion by comparing said images.

An individual acceleration sensor element reacts to the force from one direction only. Acceleration can be measured in several directions using the acceleration sensors, which are composed of two or three acceleration sensor elements. Furthermore, if the terminal comprises more than one sensors measuring in three dimensions, then the changes of the apparatus position, such as turning the apparatus into a particular direction, can be observed in addition to the motion of the terminal.

The proximity sensors are, in turn, typically optical components based on sending and receiving an optical (IR, visible light, UV) signal. The proximity sensors may also be based on heat radiation. The proximity sensors may be based on a transmitter-receiver pair, in which case the response of the receiver changes as a function of the distance of the object.

An OTM sensor is a component type, which is able to measure the motion of a surface in relation to the OTM sensor, developed by the component manufacturer OTM Technologies LTD. An OTM sensor is capable of measuring the proximity of a surface or the transverse motion across the aperture of the sensor. In an embodiment of the method where the OTM sensor is used, an object can be moved on the terminal display, such as a cursor or a finder in game applications. In such a case, two sensors are used for locating or moving the object to be moved in the vertical or horizontal direction. A third sensor allows to determine the quality of the surface beneath the sensor.

The view of the terminal display can also be scrolled, meaning that only a part of the actual view is shown at a time on the display, and the actual view may be significantly larger than the one shown on the display. Thus, when playing a game for instance, the background of the game or the appearance of the butt, such as size, model and/or colour can be changed. The view can be scrolled by informing the terminal about at least one location point as it were the origin of the coordinate system. Thereafter by moving the terminal or an object in relation to the terminal, the view on the display is scrolled correspondingly. Then, by moving the terminal upwards, the view of the display also moves upwards, and the terminal display shows an upper portion of the previous actual view. The location point can be indicated for example by lifting up the terminal and by determining this position as the uppermost location by selecting the position (up) from the menu or by using speech identification and saying "up" or using another appropriate way. A coordinate system or a block division resembling the one used in maps may also be employed when indicating the location point.

Arrow 306 illustrates the repeatability of the method starting from the creation of the virtual display. Arrow 308 illustrates the repeatability of the method using the previously created virtual display, whereby the virtual display, a portion thereof or another object, such as a finder or a cursor, is moved as frequently as necessary.

The method ends at block 310.

Figure 4:
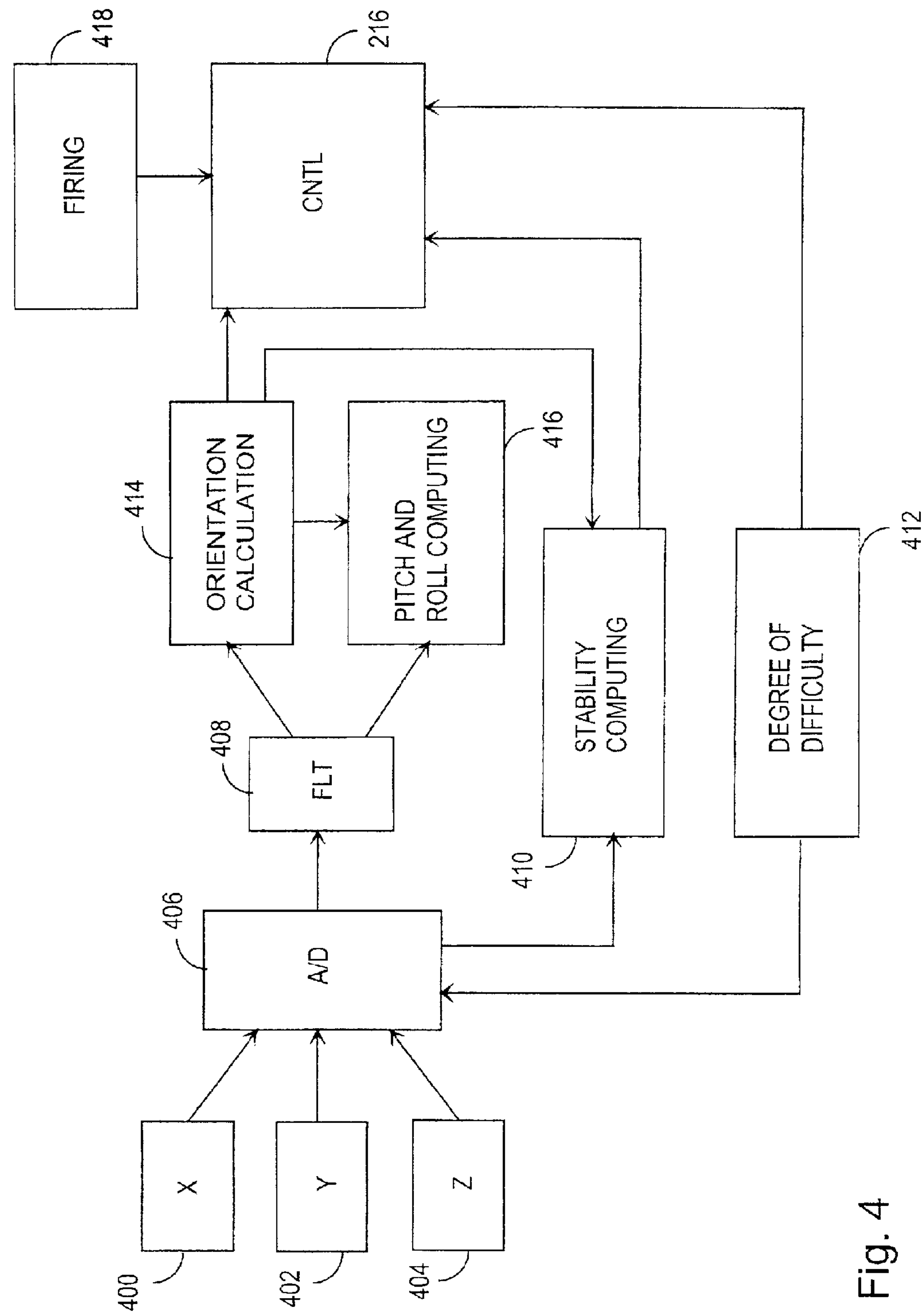
FIG. 4 is a block diagram of the system using shooting and archery game examples.

FIG. 4 illustrates the use of acceleration sensors in a terminal using shooting and archery game examples. The acceleration sensor in block 400 observes the motion of the terminal or of an object in relation to the terminal in the horizontal direction. The acceleration sensor in block 402 observes the motion of the terminal or another object in relation to the terminal in the vertical direction, and the acceleration sensor in block 404 observes the motion of the terminal or another object in relation to the terminal in the depth direction. Thus, the motion can be observed in a three-dimensional space. The signals of sensors 400, 402, 404 are supplied to the A/D converter 406, where the signals are sampled and quantized in order to convert them into digital mode for signal processing.

A filter 408, which typically is a low-pass filter, is used to filter the signals caused by too rapidly changing motions, such as the trembling of the hand, from the sensor signals. A targeting point on the display can thus be kept more stable. The remaining signal comprises the positioning data of the apparatus. FIG. 6 shows an example of a virtual butt 602 and a targeting point 604 created onto the physical display 218. The targeting point can be indicated, for example, with a cross, point or arrow. The butt can also be moved using a computer.

In block 414 the orientation of the terminal is calculated in relation to the calibrated direction on the basis of the sensor signals typically by means of a microprocessor. This enables the continuation of the game when the terminal is in different positions. The orientation may be selected by the player himself/herself or it can be automatically determined. In block 416 the tilt, acceleration, angle and rotation of the virtual display, the display portion or the object on the display or the motion thereof are correspondingly calculated in relation to the calibrated positions. The tilt is calculated in the forward, backward and side directions. The data determined in block 416 are used for controlling the finder.

Block 410 estimates the stability of the terminal, for example, by calculating the variance of the signal in different directions using the sensor signals and the motion calculated in block 414. The stability data can be used, for instance, for controlling the finder. It is not necessary to calculate the stability.

The degree of difficulty is determined in block 412. The game becomes more difficult, if the too rapidly changing motions, such as the trembling of the hands, are less filtered, whereby the aiming point, for example, trembles with the hand. In such a case, it obviously becomes more difficult to hit the target. It also becomes more difficult to hit the target, if the size of the target is reduced. If the degree of difficulty of the game is changed, the change can be carried out by the player himself/herself or the change can be programmed to take place, for example at certain intervals, or when the player has received such a number of points in the game that exceeds the predetermined threshold value. There may be more than one difficult degree thresholds.

Firing is carried out in block 418 using a key in the terminal or a touch control switch. The firing can also be carried out using a sound signal. The player is informed about the firing with a sound signal by means of a loudspeaker, with a light signal seen on the display or with a vibrator.

Signal processing of the sensor signals as well as the control of the operations, such as determining the game's degree of difficulty, are carried out in block 216, and commands are conveyed to the display, i.e. the display is controlled.

Figure 5:
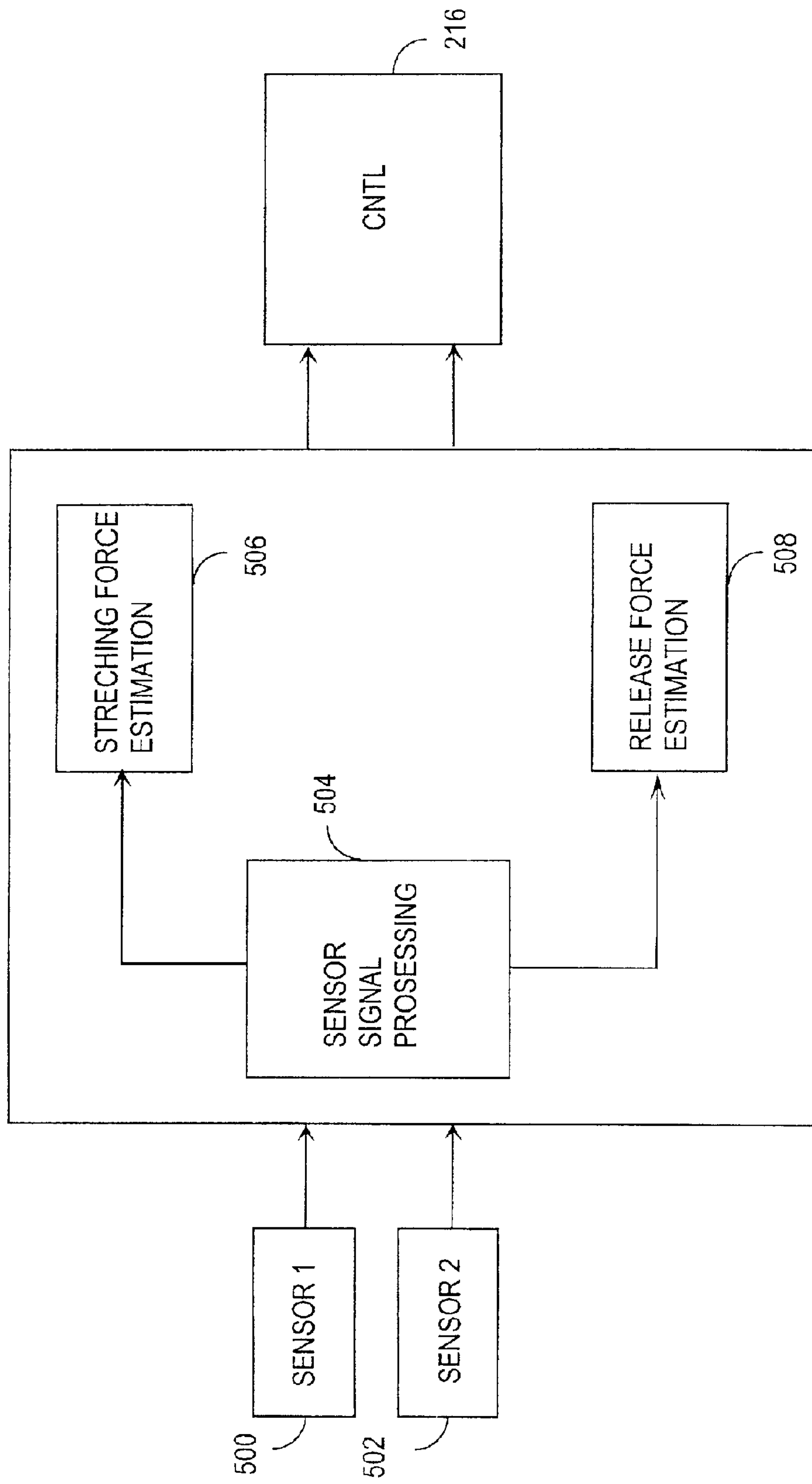
FIG. 5 is a block diagram of the system using an archery game example

In the following, FIGS. 5 and 7*a* to *c* describe an example on how the proximity sensors are used in the terminal when playing an archery game. FIG. 5 is a flowchart showing an example of a simplified terminal. FIG. 7*a* is a diagram showing an example of how the proximity sensors can be placed into the terminal. Proximity sensors are generally optical components. Proximity sensors 500 and 502 are placed in a terminal 700 so that they are in a most appropriate position for playing the archery game. In FIG. 7*a* the sensors are placed at the lower edge of the display 218. In general, the terminal also comprises keys or touch control switches 704. The stretching and release force of the bow are determined by means of the proximity sensors. The proximity sensors may be based on the transmitter receiver pairs, for example, whereby the response of the receiver changes as the function of the object's distance. The proximity sensors are typically optical components, and the signal to be transmitted is thereby light, for example, within the area of the carrier wave of the visible light. For instance, the optical sensor sends light and measures the amount of the back-reflected light. If an object obstructs the view, then only a part of the light intensity is reflected back from the object. The proximity sensor may also be based on utilizing heat radiation.

The proximity sensor signals are processed in block 504. According to the example shown in FIG. 5, this block is provided with, for example, an A/D converter and a filter that is typically a low-pass filter. The filter is used for filtering signals caused by the too rapidly changing motions, such as trembling of the hands, from the sensor signals. In this way the trembling of the butt on the display can be adjusted. Block 504 also comprises the compensation of the surrounding light. The ambient light compensation must be carried out in order for the optical proximity sensors to operate correctly irrespective of the lighting conditions.

In block 506 the stretching force is typically estimated using a microprocessor by determining a first object or in this case the distance of a finger from a first proximity sensor, and the distance of a second object, or in this case another finger, from a second proximity sensor. FIG. 7*b* shows an example of how to stretch the bow; objects 710, 712, in this case preferably the fingers, approach one another. The bow is stretched to the maximum, when the fingers touch. The terminal user can be informed about the stretch of the bow, for example, graphically on the display or using a sound signal.

Figure 7C:
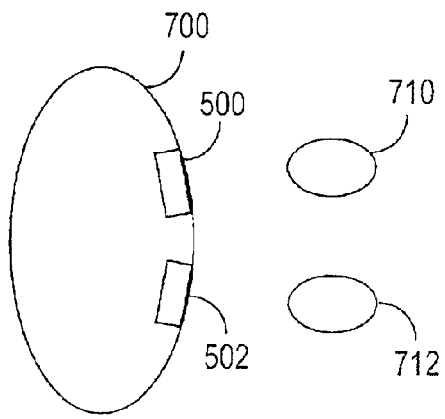

The release force is estimated in block 508 in accordance with FIG. 7*c*; the further the objects 710, 712 are from one another in FIG. 7*c*, the greater the release force becomes. The recognition of the stretch and release of the bow is based on the change of the proximity senor signals. The release occurs by identifying the two objects, preferably the fingers, which move apart from one another. The release can be carried out also using a sound signal or touching a key. The player is informed about the release with a sound signal using a loudspeaker, with a light signal seen on the display or with a vibrator.

Blocks 506 and 508 may also comprise pattern recognition in accordance with a known method. In pattern recognition a pattern of an object, such as outlines, is typically formed using the signal generated for the proximity sensors of an object, preferably the fingers, in the archery game example. The formed patterns enable to recognize the functions associated with the game, such as stretching and releasing the bow.

The control block 216 is in charge of processing the sensor signals, determining the forces and transmitting commands onto the display.

The invention is preferably implemented by software, the terminal thus comprising one or more microprocessors, in which the operations of the method presented as the operating software are implemented. The invention can also be implemented, for example, with apparatus solutions offering the required functionality, such as ASIC (Application Specific Integrated Circuit) or by utilizing separate logic components.

Even though the invention has above been explained with reference to the example in the accompanying drawings, it is obvious that the invention is not restricted thereto but can be modified in various ways within the scope of the inventive idea disclosed in the attached claims.

What is claimed is:

1. A method for controlling a terminal display, the method comprising:

providing the terminal display with at least one virtual display, a display portion or an object, and moving at least the virtual display, the display portion or the object on the terminal display using the motion or location of an object proportioned to the terminal, wherein said method comprises a shooting game, and a target and an aiming point are shown on the terminal display, and the motion of the aiming point on the terminal display is proportioned to the motion of the object in relation to the terminal.

2. A method as claimed in claim 1, wherein a user is informed about a release or the object in relation to the terminal in the shooting game with a sound signal, a light signal or a vibrator.

3. A method as claimed in claim 1, wherein the motion of the object in relation to the terminal is identified by means of proximity sensors.

4. A method as claimed in claim 1, wherein the motion of the object in relation to the terminal is identified by means of sensors manufactured by OTM (Optical Translation Measurement) Technologies Ltd.

5. A method as claimed in claim 1, wherein the motion of the object in relation to the terminal is identified using a camera to take at least two consecutive images.

6. A terminal comprising;

a terminal display;

a user interface;

means for providing the terminal display with at least one virtual display, a display portion or an object; and means for moving at least the virtual display, the display portion or the object on the terminal display using the motion or location of an object proportioned to the terminal display, wherein said terminal comprises a shooting game, and a target and an aiming point are shown on the terminal display, and the motion of the aiming point on the terminal display is proportioned to the motion of the object proportioned to the terminal.

7. A terminal as claimed in claim 6, wherein a release or the object proportioned to the terminal in the shooting game by touching a key or a touch control switch or by means of a voice.

8. A terminal as claimed in claim 6, wherein a user is informed about a release or the object proportioned to the terminal in the shooting game with a sound signal, a light signal or a vibrator.

9. A terminal as claimed in claim 6, wherein the motion of the object proportioned to the terminal is identified by means of proximity sensors.

10. A terminal as claimed in claim 6, wherein the motion of the object proportioned to the terminal is identified by means of sensors manufactured by OTM (Optical Translation Measurement) Technologies Ltd.

11. A terminal as claimed in claim 6, wherein the motion of the object proportioned to the terminal is identified using a camera to take at least two consecutive images.

12. A method for controlling a terminal display, the method comprising:

providing the terminal display with at least one virtual display, a display portion or an object, and moving at least the virtual display, the display portion or the object on the display using the motion or location of, an object proportioned to the terminal, wherein said method comprises an archery game, and the target and the aiming point are shown on the terminal display, and the motion of the aiming point on the terminal display is proportioned to the motion of the object in relation to the terminal, and a stretch of a bow is modeled using the distance between two objects.

13. A method as claimed in claim 12, wherein said objects in relation to the terminal comprise fingers.

14. A method as claimed in claim 12, wherein a stretching force of the bow in the archery game is depicted on the terminal display using colors or graphic symbols.

15. A method as claimed in claim 12, wherein a stretching force of the bow in the archery game is depicted using a sound signal.

16. A method as claimed in claim 12, wherein a release or the object in relation to the terminal in the archery game occurs by touching a touch control switch or a key or by means of a voice.

17. A method as claimed in claim 12, wherein a release or the object in relation to the terminal in the archery game occurs by identifying two objects, which are drawn away from one another.

18. A method as claimed in claim 17, wherein said objects in relation to the terminal comprise fingers.

19. A method as claimed in claim 12, wherein a user is informed about a release or the object in relation to the terminal in the archery game with a sound signal, a light signal or a vibrator.

20. A method as claimed in claim 12, wherein the motion of the object in relation to the terminal is identified by means of proximity sensors.

21. A method as claimed in claim 12, wherein the motion of the terminal is identified by means of sensors manufactured by OTM (Optical Translation Measurement) Technologies Ltd.

22. A method as claimed in claim 12, wherein the motion of the object in relation to the terminal is identified using a camera to take at least two consecutive images.

23. A terminal comprising;

a terminal display;

a user interface;

means for providing the terminal display with at least one virtual display, a display portion or an object; and means for moving at least the virtual display, the display portion or the object on the terminal display using the motion or location of an object proportioned to the terminal, wherein said terminal comprises an archery game, and the target and the aiming point are shown on the terminal display, and the motion of the aiming point on the display is proportioned to the motion of the object in relation to the terminal, and that a stretch of a bow is modelled using the distance between two objects in relation to the terminal.

24. The terminal as claimed in claim 23, wherein said objects in relation to the terminal comprise fingers.

25. A terminal as claimed in claim 23, wherein a stretching force of the bow in the archery game is depicted on the terminal display using colors or graphic symbols.

26. A terminal as claimed in claim 23, wherein a stretching force of the bow in the archery game is depicted using a sound signal.

27. A terminal as claimed in claim 23, wherein a release or the object in relation to the terminal in the archery game occurs by touching a key or a touch control switch or by means of a voice.

28. A terminal as claimed in claim 23, wherein a release in the archery game occurs by identifying two objects in relation to the terminal, which are drawn away from one another.

29. A terminal as claimed in claim 28, wherein said objects in relation to the terminal comprise fingers.

30. A terminal as claimed in claim 23, wherein a user is informed about a release or the object in relation to the terminal in the archery game with a sound signal, a light signal or a vibrator.

31. A terminal as claimed in claim 23, wherein the motion of the object in relation to the terminal is identified by means of proximity sensors.

32. A terminal as claimed in claim 23, wherein the motion of the object in relation to the terminal is identified by means of sensors manufactured by OTM (Optical Translation Measurement) Technologies Ltd.

33. A terminal as claimed in claim 23, wherein the motion of the object in relation to the terminal is identified using a camera to take at least two consecutive images.

* * * * *